June 1, 1937.   F. M. J. T. DE POIX   2,082,151
CUSHION PARTICULARLY FOR SEATS AND BACK SUPPORTS OF VEHICLES
Filed Nov. 9, 1933   2 Sheets-Sheet 2

Inventor
Felix Marie Joseph Tyrel de Poix
By Williams, Bradbury, McCaleb & Hinkle
Attys Patented June 1, 1937

2,082,151

UNITED STATES PATENT OFFICE 2,082,151

CUSHION PARTICULARLY FOR SEATS AND BACK SUPPORTS OF VEHICLES

Félix Marie Joseph Tyrel de Poix, Rueil, France, assignor to Societe H. & F. de Poix & Cie, Rueil (S. & O.), France, a corporation of France Application November 9, 1933, Serial No. 697,291
In France November 16, 1932

6 Claims. (Cl. 155—179)

The invention relates to cushions and more particularly to india-rubber cushions for seats and back supports of vehicles.

It has been already proposed to construct a cushion for such use or the like by employing a mass of india rubber or of cellular rubber either having on its surface the skin which is formed during the manufacture, or deprived of said skin. Cushions of this type are generally heavy, warm to the body and insufficiently rigid. In order to remove these disadvantages, the inventor has previously proposed the formation of large recesses in the lower face of the cushion, the drilling of passages through the rubber mass and the provision of transverse fasteners designed to increase the lateral rigidity of the cushion.

The main object of the invention is a new improvement in rubber cushions of any kind.

The invention is characterized by the fact that the cushion is made of a mass of rubber, forming on its upper face a kind of pavement the elements of which are spaced one from another on at least a portion of their height. The said elements are thus capable of moving separately and at the same time are all connected at their lower end. The elements may be for instance from 3 to 15 centimeters high and from 3 to 10 centimeters broad.

The invention also concerns a mould for the manufacture of such cushions.

Various embodiments of the invention as applied to cushions of different kinds are hereinafter described by way of example, in conjunction with the annexed drawings, in which.

Figures 6 to 11 relate to the mould and illustrate the method of manufacture of cushions of this second type.

Figure 6:
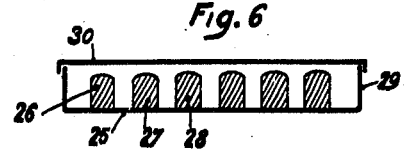

Figure 6 is a diagrammatic cross section view of said mould.

Figure 7:
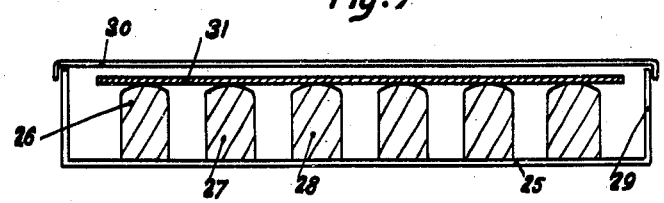

Figure 7 is a similar view with a sheet of crude rubber.

Figure 8:

Figure 8 shows what the sheet of Figure 7 would become if treated in a flat mould, and after formation of the cells during the process.

Figure 4:
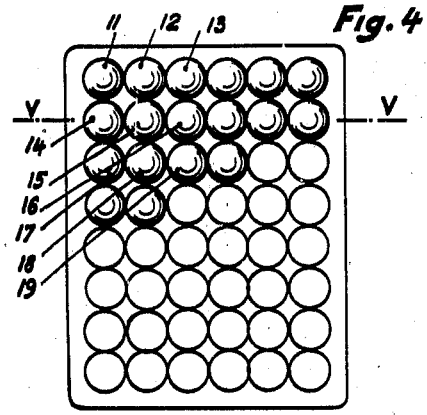
Figures 4 and 5 represent respectively a plan view of a cellular rubber cushion of another type, and a cross-section of same through the line V—V of Figure 4.
Figure 5:
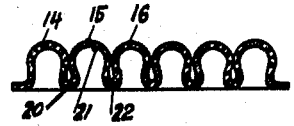
Figure 9:
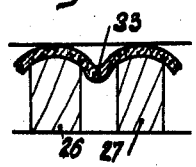
Figure 11:
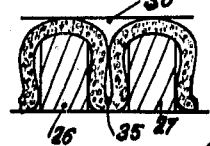

Figures 9 and 11 illustrate some of the various states through which passes the sheet of cellular rubber during the heat treatment in the mould shown on Fig. 7 during the passage from the plane shape of Fig. 7 to the final state of the cushion as shown in Figures 4 and 5.

Figure 12:
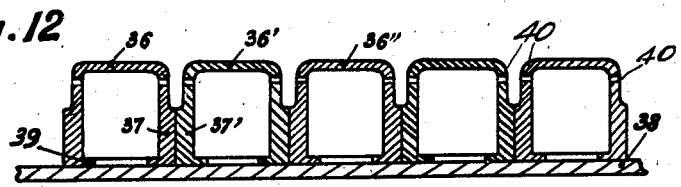

Figure 12 is a cross-sectional view of an alternative embodiment of a plain rubber cushion provided with holes and constructed according to the invention.

Figure 1:
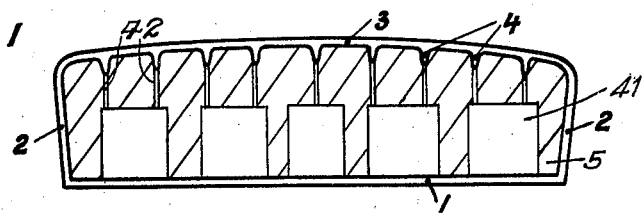
Figure 1 shows diagrammatically a cross section taken on the line I—I of Figure 2 of one form of a cellular rubber cushion placed in its manufacturing mold.
Figure 2:
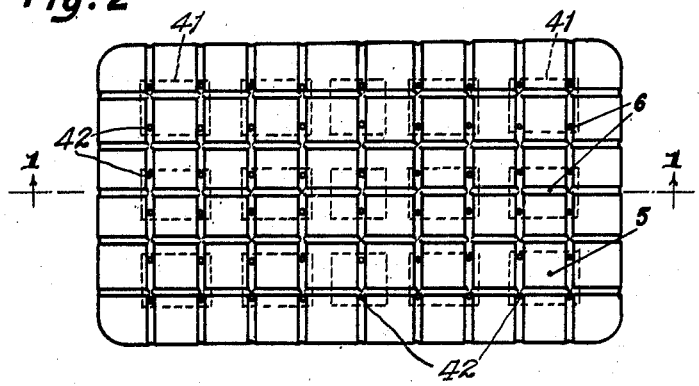
Figure 2 is an enlarged plan view of a cushion obtained from the mould of Figure 1.
Figure 3:
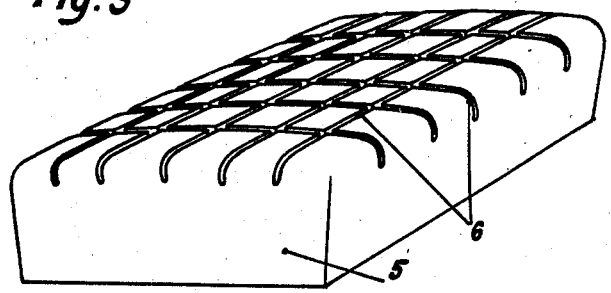
Figure 3 is a perspective view of the same.

Referring to Figure 1, the mould comprises as usual a body I provided with side and end walls 2 and a cover 3, some of said walls being advantageously removable to facilitate the withdrawal of the article.

On its internal face, the cover 3 is provided with strong ribs 4 forming a series of squares projecting from the cover in suitable heights (from 3 to 10 cm.) and disposed so as to penetrate into the upper face of the cushion.

It will be understood that the cushion 5 of cellular rubber or the like, obtained in such a mould, will have its upper face provided with grooves 6 which are more or less deep and more or less wide, dividing small blocks of cellular rubber which are thus spaced one from another at their upper part. Upon coming out of the mould, the cushion is provided on its underside with recesses 41. The said recesses may also be obtained by moulding. They are made to communicate with grooves 6 by means of passages 42. The cushion may afterwards be covered with a lining of fabric or leather, like ordinary cushions.

In the alternative construction shown in Figure 4, the cushion is made of a series of cups 11, 12, 13, 14, 15, 16, 17, 18, 19, . . . placed side by side. Each cup 15 which is not near the edge is surrounded by four other cups 12, 14, 16 and 18. As represented in section Figure 5, the cup 15 is formed by means of a sheet of cellular rubber 20, 21, 22 having a thickness of about 1 to 2 cm. and the cup itself is about 10 cm. in height and diameter. Such a cup possesses relatively little rigidity either in the direction of crushing down, or in the direction of lateral motion. But a cushion constituted by a series of such cups, integrally united at their lower end, possesses suitable rigidity. In fact, because of the small size of the individual cups, when the user is sitting down on such a cushion, he is engaging a large number of cups, each of which undergoes a relatively small pressure. Besides, each cup 15 being surrounded by four other cups 12, 14, 16 and 18 will not easily move laterally, nor will those movements be important. It can not be easily depressed, because its depression would produce its expansion, thereby being positively supported by the adjacent ones.

In order to increase the resistance against lateral motion, a connection may be provided between adjacent cups 15 and 12, 14, 16, 18, the said connection being accomplished for instance by sticking or stitching together the rubber surfaces along the contact lines.

Such a cushion can be advantageously manufactured in one operation by treating in a mould such as the one shown in Figures 6 to 11, a sheet of crude cellular rubber, that is to say of rubber provided with the reagents which are to produce the gas for forming the cells in the rubber when suitably heated.

The mould comprises a base plate 25, having a number of projections or fingers 26, 27, 28, a frame 29 for the plate 25 and a cover 30.

Figure 10:
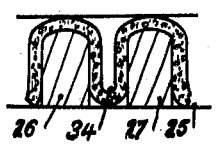

For manufacturing the cushion shown in Figures 4 and 5, a sheet of crude cellular rubber 31 (Fig. 7) is introduced in the mould with its lower face supported on the projections 26, 27, 28, and the mould is closed by means of the cover 30 which is thus slightly above the sheet 31. It is known that, if a sheet of crude cellular rubber such as 31 be supported on a plane surface and submitted to a suitable heat treatment, it will expand and thus give, a plate such as 32 (Fig. 8) the length and thickness of which are greater than those of the initial plate 31, for instance twice the size of the latter. With regard to this fact, it will easily be understood how the sheet 31 will behave in the improved mould of Figure 6. At the beginning of the heat treatment, the mass of rubber softens and begins to fall down between two consecutive projections such as 26, 27, as shown in 33 (Fig. 9). Further heating will make the falling portion of the sheet reach the base plate 25, as shown in 34 (Fig. 10). This increase of the surface of the rubber sheet is produced not only by the softening of the rubber, but also by the expansion of same and particularly in the direction of its length as shown in Figure 8. When the operation is complete, the fallen portion of the sheet between two consecutive projections such as 26 and 27 will have substantially the form illustrated in 35 (Fig. 11); in other words, the mass of rubber will usually be thicker at the fallen portion than at the top of the projections where its thickness is limited by the cover 30. This extra-thickness has the advantage of affording more rigidity to the lower part of the cushion. The diameter of the top part of each cup will generally be greater than that of the corresponding projection, because it is under the said upper part that the air confined below the rubber sheet 21 will gather, and expand when heated. The opposite surfaces of the fallen portion 35 which abut one another between two successive projections such as 26 and 27 may be stuck together along a portion of their length during the heat treatment or afterwards, thereby uniting to a certain extent the various cups and increasing the resistance of the cushion against lateral motion, as explained above.

In the alternative construction according to the invention and illustrated in Figure 12, the resilient elements are constituted by means of cups of non-cellular rubber having comparatively thin walls solid or hollow, the said cups being united by sticking, stitching or any other suitable means and fixed upon a common base plate.

Such cups may be obtained for instance from separate mouldings and preferably be provided with vertical ribs extending from the lower end along a section of the length of the cup, the said ribs being designed for connecting the cups together while leaving free the upper part of the cups which constitute a kind of pavement like in the preceding examples.

Each element of such a cushion is in the form of a cup 36 of non-cellular rubber, circular or hexagonal in section, of 2 to 8 cm. in diameter, having comparatively thin walls of 0.5 to 1 cm. thick, the said walls being solid or provided with holes which latter may for instance communicate with the outside. The cup 36 having for instance cylindrical walls is provided along a section of the length of said walls with external ribs 37. In the upper part, which does not have any ribs, each block is provided with passages 40. All the cups 36 are fixed on a rubber base plate 38 by means of a flange 39 formed at the lower end of the cup 36, the said flange projecting both from the inside and the outside of the wall between the vertical ribs 37. The cups are disposed side by side so as to constitute a kind of pavement. The opposite ribs 37 and 37' of two adjacent cups are fixed together by stitching, sticking with rubber solution or by any other suitable means.

The principal advantage of the improved cushions constructed according to the invention is that the independent elements or blocks, free to move at their upper portion, enable the top of the cushion to adapt itself exactly to the shape of the passenger sitting or leaning with his back upon the said cushion and to follow all his movements, especially where such a cushion is utilized as a seat or a back support in an automobile or a railway coach, as a mattress in a bed for hospital, camping or the like.

Further advantages of the cushion result from its special construction. Each block of the top of the cushion being independent of its neighbours operates alone and does not react upon them. Hence in the case of a cushion utilized in a vehicle, when the latter is turning and an increased load is applied to the part situated nearest to the outside of the curve, each working block of that part tends to fall down without acting upon its more external neighbours, while in an ordinary cushion with continuous surface the lowered portion tends to lower the surrounding portions, thus resulting in that the passenger is more completely displaced towards the outside of the curve. The special construction of the improved cushion obviates this displacement which is particularly dangerous when it occurs in an automobile, the passenger being thrown towards the driver, who may lose the control of the steering wheel and the brakes.

On the other hand, the to and fro motion of the independent blocks of the cushion top produces a continuous circulation of air under the lining and ensures a fresh and pleasant seat.

The ventilation will be even better if, as mentioned above, the cushion is provided with large recesses at its lower part and if the said recesses communicate with the grooves formed between the blocks. Owing to the bellows-like action of the cushion, the air contained in the said recesses will be exhausted or sucked through the passages and the grooves, i. e. immediately beneath the lining and the circulation of air in the said grooves will be considerably increased.

What I claim is:

1. A resilient cushion comprising a series of rubber elements disposed adjacent one another, means for uniting the said elements through a portion of their height to adjacent elements, grooves provided between each element and the adjacent elements at the top thereof, recesses provided on the underside of the elements and passages connecting said grooves to said recesses.

2. A resilient cushion comprising a series of rubber elements in the form of cups opened at one end and closed at the other end, means such as ribs being provided extending along a portion of the walls of said elements from the opened end thereof, means for connecting each element to the adjacent elements through said ribs, passages provided in the cups in the closed ends thereof in a manner to connect the inner recess of each cup with the spacing separating it from the adjacent cups, and a member for supporting and uniting all the elements at the opened ends thereof.

3. A cushion comprising a series of resilient elements disposed adjacent one another, recesses provided on the underside of said elements, adjacent resilient elements being spaced from one another on their upper side and being arranged to contact laterally with each other throughout a portion of their height, and passageways connecting said recesses with the spaces between said adjacent resilient elements.

4. An elastic cushion for automobile and the like seats, comprising a moulded block of sponge rubber composed of a large plurality of generally bell-shaped elements with their open ends faced downwardly and disposed closely adjacent one another to form a cushion surface, the longitudinal and transverse dimensions of said bells being small with respect to the length and width of the cushion, the base portions of said bell-shaped elements being connected to one another to form a network of relatively deep spacing grooves at the top of said bell-shaped elements separating the adjacent bell-shaped elements from one another, said spacing grooves being sufficiently narrow with respect to the transverse dimensions of the elements to enable the walls of each of the elements along the grooves to come in contact with the walls of its adjacent elements, when weight is applied to the upper surface of said cushion.

5. A resilient cushion comprising a series of rubber elements in the form of cups disposed adjacent to each other and open at one end and closed at the other end, said cup elements being joined along a portion of their walls near the open ends thereof and spaced from each other to form interstitial grooves at their other ends, said cup-shaped elements having openings formed in the walls thereof above the said joined wall portions, at least one of the openings in each of said cup-shaped elements being located in the wall thereof between the hollow interior of the cup-shaped element and the groove separating that element from said adjacent elements.

6. A resilient cushion comprising a series of rubber elements in the form of cups disposed adjacent to each other and opened at one end and closed at the other end, said cup elements being integral along a portion of their walls from the opened end thereof, passages provided through the walls of said cup elements above said integral wall portions, at least one of said passages connecting the recess in the opened end of each cup with the spacing separating it from the adjacent cups, and a rubber member supporting all of the elements at the opened ends thereof and having portions attached to portions of the series of rubber elements.

FÉLIX MARIE JOSEPH TYREL DE POIX.